United States Patent [19]

Earleson

[11] Patent Number: 5,669,464

[45] Date of Patent: Sep. 23, 1997

[54] SYSTEM FOR AUTOMATICALLY CONTROLLING ENGINE LUBRICATING FLUID FLOW

[75] Inventor: Walter E. Earleson, Morton, Ill.

[73] Assignee: Caterpillar Inc., Peoria, Ill.

[21] Appl. No.: 763,966

[22] Filed: Dec. 10, 1996

[51] Int. Cl.⁶ .................................................. F16C 3/14
[52] U.S. Cl. ................................. 184/1.5; 123/196 S
[58] Field of Search ................. 184/1.5, 6.5; 141/98; 123/196 R, 196 S

[56] References Cited

U.S. PATENT DOCUMENTS

| | | | |
|---|---|---|---|
| 3,447,636 | 6/1969 | Bonfilio | 184/1.5 |
| 4,128,140 | 12/1978 | Riches | 184/1.5 |
| 4,134,380 | 1/1979 | Niwa et al. | 123/142.5 |
| 4,193,487 | 3/1980 | Takeuchi | 184/1.5 |
| 4,299,307 | 11/1981 | Scott | 184/103 |
| 4,674,456 | 6/1987 | Merritt | 123/196 |
| 4,724,926 | 2/1988 | Collins | 184/1.5 |
| 4,869,346 | 9/1989 | Nelson | 184/1.5 |
| 5,056,622 | 10/1991 | Vermeulen | 184/6.4 |
| 5,092,429 | 3/1992 | Linares et al. | 184/1.5 |
| 5,372,219 | 12/1994 | Peralta | 184/1.5 |
| 5,390,762 | 2/1995 | Nelson | 184/1.5 |
| 5,562,181 | 10/1996 | Elkin et al. | 123/196 R |
| 5,566,781 | 10/1996 | Robert et al. | 141/98 |

Primary Examiner—Thomas E. Denion
Attorney, Agent, or Firm—Alan J. Hickman

[57] ABSTRACT

A system for automatically controlling lubricating fluid flow in an internal combustion engine having an engine bearing lubricating system, an intake oiling system and a pair of lubricating fluid reservoirs for carrying separate lubricating fluid for delivery to the engine bearing and intake oiling systems is provided. In response to the fluid level in one of the reservoirs being delivered to the intake oil system being at a predetermined low level, the controller swaps reservoirs and delivers fluid flow from the other reservoir to the intake oiling system. The controller commands filling of the low level reservoir prior to delivery of lubricating fluid from this reservoir to the engine bearing lubricating system. The system eliminates the need for lubricating fluid changes.

16 Claims, 2 Drawing Sheets

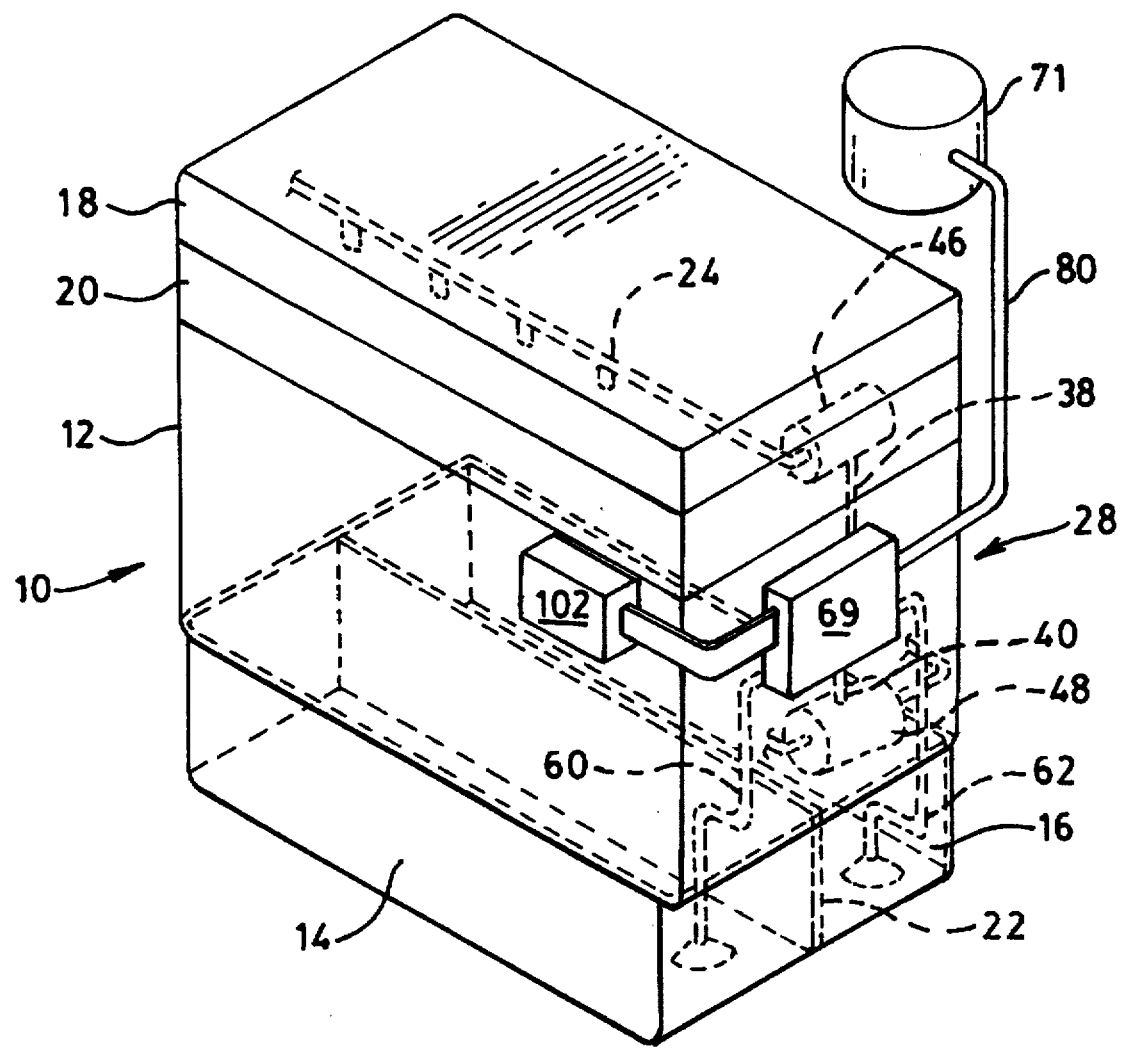

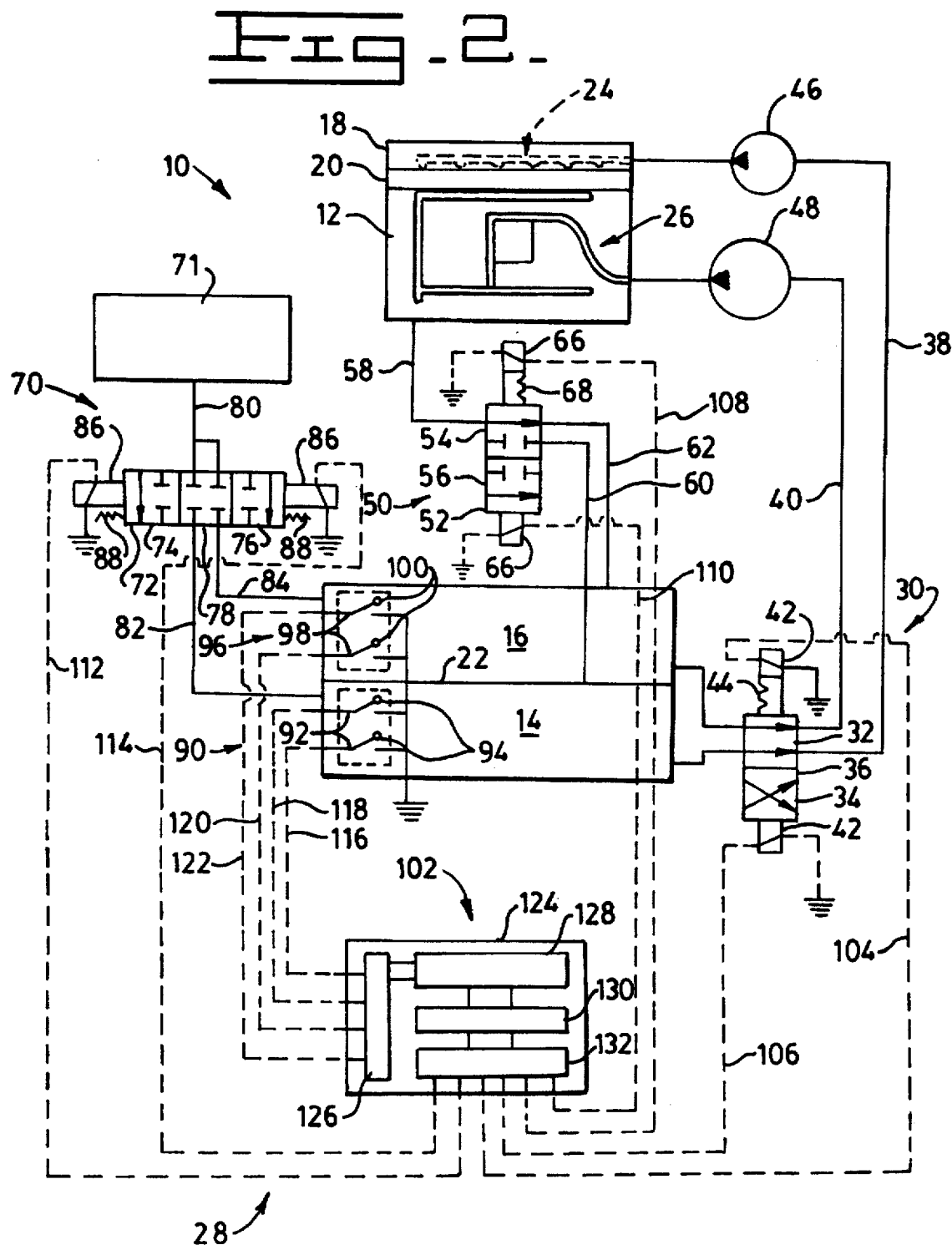

SYSTEM FOR AUTOMATICALLY CONTROLLING ENGINE LUBRICATING FLUID FLOW

1. Technical Field

This invention relates to a system for eliminating the need to change and dispose of contaminated engine lubricating fluid by automatically controlling lubricating fluid flow in an internal combustion engine having first and second reservoirs selectively and separately in communication with intake oiling and bearing lubricating systems.

2. Background Art

In internal combustion engines it is desirable to extend the time between lubrication oil changes as far as possible. The cost associated with an oil change in some engines is significant. Some engines, such as used in electrical power generation and pumps, require more than two hundred and fifty gallons of oil. The disposal of dirty oil is also complicated and expensive due to the environmental implications and handling. Engine down time for an oil change in large engine applications, such as power generation, pumping and the like, is undesirable. It is therefore desirable to eliminated the need for an oil change requirement in internal combustion engines.

Automatic oil change and makeup systems have been developed which dispose of dirty internal combustion engine lubricating oil by mixing the contaminated engine lubricating oil with engine fuel and subsequently burn the fuel and lubricating oil mixture in the engine combustion process. These systems eliminate the need for oil changes and the disposal of the contaminated oil. However, such systems are costly and require complex componentry to properly control fuel and oil mixing so proper combustion properties are maintained.

In automatic oil change and makeup systems, the lubricating oil is drawn from a single the oil sump and mixed with the fuel. As the engine continues to operate the oil continues to become progressively more contaminated. Fresh make up oil is added to the contaminated oil to maintain an adequate supply of lubricating oil for engine bearing lubricating purposes. Since the oil sump is not adequately or completely drained, the supply of lubricating oil delivered to the lubricating system always contains some contaminated oil. This of course is unsatisfactory as oil contamination results in premature wear of internal combustion engine components such as bearings, shafts, cylinder, piston rings, valves and the like.

The inability to reduce the sump oil level to an acceptable level prior to filling is based on the need to maintain an adequate amount of oil in the sump for component lubrication purposes. Also, starving the suction side of the lubricating pump of oil will cause pump cavitation. These conditions are unacceptable as they normally result in premature wear and early failure of the components.

The present invention is directed to overcoming one or more of the problems as set forth above.

DISCLOSURE OF THE INVENTION

In one aspect of the present invention, a system for automatically controlling the flow of lubricating fluid in an internal combustion engine having an intake oiling system, an engine bearing lubricating system and first and second reservoirs, each carrying a separate lubricating fluid, is provided. A first fluid control device passes fluid flow from the second reservoir to the engine bearing lubricating system and from the first reservoir to the intake oiling system. A first sensor senses the lubricating fluid level in the first reservoir and delivers a first signal in response to the lubricating fluid being at a preselected low level. A controller receives the first signal and responsively conditions the first fluid control device to swap reservoirs and deliver fluid flow from the second reservoir to the intake oiling system and from the first reservoir to the engine bearing lubricating system.

In another aspect of the present invention, a system for automatically controlling the flow of lubricating fluid in an internal combustion engine having an intake oiling system, an engine bearing lubricating system and first and second reservoirs, each carrying a separate lubricating fluid, is provided. A first sensor, connected to the first reservoir, senses the level of the lubricating fluid therein and delivers a first fluid level signal in response to the lubricating fluid in the first reservoir being at a predetermined low level. A second sensor, connected to the second reservoir, senses the level of the lubricating fluid therein and delivers a second fluid level signal in response to the lubricating fluid in the second reservoir being at a predetermined low level. A first valve having first and second fluid directing positions is connected to the first and second reservoirs and the intake oiling and engine bearing lubricating systems. The first valve passes fluid flow from the second reservoir to the engine bearing lubricating system and from the first reservoir to the intake oiling system at the first position of the first valve. The first valve passes fluid flow from the second reservoir to the intake oiling system and from the first reservoir to the engine bearing lubricating system at the second position. A second valve having first and second fluid directing positions is connected to the engine lubricating system and the first and second reservoirs. The second valve passes fluid flow from the engine lubricating system to the first reservoir at the second position of the second valve and from the engine lubricating system to the second reservoir at the first position of the second valve. A controller connected to the first and second sensors is adapted to receive the first and second fluid level signals The controller delivers a valve control signal to the first and second valves in response to receiving one of said first and second fluid level signals. The first and second valves move to the second position in response to the controller receiving the first fluid level signal and to the first position in response to said controller receiving the second fluid level signal.

In yet another aspect of the present invention, a third reservoir having a makeup lubricating fluid carried therein is provided for filling an emptied one of the first and second reservoirs prior to a swapping of the first and second reservoirs.

BRIEF DESCRIPTION OF THE DRAWINGS

FIG. 1 is a diagrammatic isometric view of an embodiment of the present invention showing an internal combustion engine and a system for controlling the flow of fluid between first and second reservoirs and engine lubrication and intake oiling systems; and FIG. 2 is a diagrammatic schematic drawing of the internal combustion engine and control system of FIG. 1.

BEST MODE FOR CARRYING OUT THE INVENTION

With reference to the drawings and particular FIG. 1, an internal combustion engine 10 has an engine block 12 first and second reservoirs 14,16 connected to the engine block 12 in any suitable manner, such as by threaded fasteners (not shown) and an intake manifold 18 connected to a cylinder head 20 mounted on the engine block 12.

The first and second reservoirs 14,16 are shown as having a common housing 17 with a longitudinal partition 22 separating the lubricating fluid therein. It is to be noted that the partition 22 may be transversely oriented rather than longitudinally oriented without departing from the invention. Separate housings may be provided instead of the common housing 17 as shown without affecting or departing from the invention. The importance is that the lubricating fluid contained in the first reservoir 14 is maintained separated from the lubricating fluid in the second reservoir 16. This separation prevents contamination of one fluid by the other.

The engine intake manifold 18 has an intake oiling system 24 which distributes a supply of lubricating fluid to the intake valves and associated structure. Such a system may includes nozzles or openings for spraying or distributing the lubricating fluid at one or more appropriate locations with in the intake manifold and relative to the intake valves (all not shown). This lubricating oil is subsequently drawn into and combusted in the engine combustion chambers along with the engine fuel during engine operation. Intake oiling systems 24 such as this are well known in the art and will not be discussed in any greater detail.

An engine bearing lubrication system 26 has a plurality of fluid directed passages provided in, for example, the engine block, cylinder head, crank shaft and the like for passing lubricating fluid flow to engine bearings and other movable components of the engine (all not shown). Because bearing lubricating systems 26 and the purpose thereof is well known in the art, further discussion related to such systems will not be made.

As best seen in FIG. 2, a system 28 for automatically controlling the flow of lubricating fluid between the intake oiling system 24, the lubricating system 26 and the first and second reservoirs 14,16 is shown schematically. The system 28 includes a first fluid control means 30 for passing lubricating fluid flow from the second reservoir 16 to the engine bearing lubricating system and from the first reservoir 14 to the intake oiling system 24 at a first position 32 of the first control means 30 and from the first reservoir 14 to the engine bearing lubricating system 26 and from the second reservoir to the intake oiling system at a second position 34 of the first control means. The first fluid control means 30 includes a first valve 36, a two position four way valve, disposed in a first fluid passing conduit 38 connecting the first reservoir 14 to the intake oiling system 24 and in a second fluid passing conduit 40 connecting the second reservoir 16 to the bearing lubricating system 26. The first valve 36 is movable between the first and second positions 32,34 by way of a pair of solenoids 42. The first valve 36 is maintained at the shifted to one of the first and second positions by a detent mechanism 44 of any suitable commercially available type. The detent mechanism 44 may include a pair of spaced grooves on the valve spool of the first valve and a spring biased plunger engaged with one of the grooves (all not shown). It is to be noted that a pair of valves, one disposed in each of the first and second conduits, may be substituted for the first valve 36 without departing from the invention.

A first lubricating fluid passing pump 46 is connected in the first conduit 38 between the first valve 36 and the intake oiling system 24. The first pump 46 draws lubricating fluid from one of the first and second reservoirs 14,16, determined by the position of the first valve 36, and passes the lubricating fluid to the intake oiling system 24. The first pump 46 is preferably an axial piston pump driven by a cam shaft of the engine by way of a push rod. Since such pumps are well known in the art and will not be discussed in any greater detail.

A second lubricating fluid passing pump 48 is connected in the second conduit 40 between the first control valve 36 and the bearing lubricating system 26. The second pump 48 draws lubricating fluid from one of the first and second reservoirs 14,16, as determined by the position of the first valve 36, and passes the lubricating fluid to the bearing lubricating system 26. The second pump 48 is preferably a rotary pump of any suitable type well known in the art, for example a gear pump.

A second fluid control means 50 is connected to the engine lubricating system 26 and the first and second reservoirs 14,16. The second fluid control means 50 delivers return lubricating fluid flow from the engine bearing lubricating system 26 to a selected one of the first and second reservoirs 14,16. The second fluid control means 50 includes a second valve 52, a two position four way valve, having first and second fluid directing positions 54,56. The second valve 52 is movable between the first and second positions 54,56. The second valve 52 is disposed between a drain conduit 58 connecting the bearing lubricating system 26 to the second valve 52 and first and second drain conduits 60,62 connecting the second valve 52 to the first and second reservoirs 14,16 respectively. The engine block 12 is preferably sealed at a connection to the reservoirs 14,16 and defines an engine block compartment 64. The drain conduit 58 connects the bearing lubricating system to the second valve 52 by way of the drain connection 58 to the sealed engine block compartment 64. The second valve 52, at the first position 54, delivers return fluid flow from the bearing lubricating system 26 to the second reservoir 16 by way of the second conduit 62, and at the second position 56, delivers return fluid flow to the first reservoir 14 by way of the first conduit 60. The second valve 52 is movable between the first and second positions 54,56 by way of a pair of solenoids 66. The second valve 52 is maintained at the shifted to one of the first and second positions 54,56 by a detent mechanism 68 of any suitable commercially available type, including the type discussed above. A pair of valves, one disposed in each of the first and second conduits, may be substituted for the second valve 52 without departing from the spirit of the invention.

The system includes a third fluid control means 70 connected to the first and second reservoirs 14,16 for selectively controlling the passing of makeup lubricating fluid from a third reservoir 71 to one of the first and second reservoirs 14,16. The third fluid control means 70 includes a third valve 72, a three position, four way valve, having first and second fluid directing positions 74,76 and a third fluid blocking position 78. The third valve 72 is movable between the first, second and third positions 74,76,78. A makeup fluid passing conduit 80 connects the third reservoir 71 to the third valve 72 and first and second makeup fluid passing conduits 82,84 connects the third valve 72 to the first and second reservoirs 14,16. The third valve 72, at the first position 74, delivers makeup fluid flow from the third reservoir 71 to the first reservoir 14 by way of the first conduit 82 and at the second position 76, delivers make fluid flow from the third reservoir 71 to the second reservoir 16 by way of the second conduit 84. Makeup fluid flow is blocked at the third valve 72, at the third position 78 thereof, from passing through the first and second conduits 82,84 to the first and second reservoirs 14,16. The third valve 72 is movable between the first and second positions 74,76 by way of a pair of solenoids 86. The third valve 72 is centered by springs 88 and normally biased to the third position 78. A pair of valves, one disposed in each of the first and second conduits, may be substituted for the third valve 72 without departing from the spirit of the invention.

A first sensing means 90 is provided for sensing the lubricating fluid level in the first reservoir 14 and delivers a first fluid level signal in response to said lubricating fluid being at a preselected low level and delivers a third fluid level signal in response to the lubricating fluid being at a predetermined full level. The first sensing means 90 is disposed in and connected to the first reservoir 14. As shown, the first sensing means 90 is configured as a pair of switches 92 each having a float responsive to the lubricating fluid level and the position of the float 94. It is noted that other devices suitable for sensing fluid level are considered equivalents and within the spirit of the invention.

A second sensing means 96 senses the lubricating fluid level in the second reservoir 16 and delivers a second fluid level signal in response to the lubricating fluid being at a preselected low level and delivers a fourth fluid level signal in response to the lubricating fluid being at a predetermined full level. The second sensing means 96 is disposed in and connected to the second reservoir 16. As shown, the second sensing means is configured as having pair of switches 98 each having a float 100 responsive to the lubricating fluid level and the position of the float 100. It is noted that other devices suitable for sensing fluid level are considered equivalents and within the spirit of the invention.

A control means 102, connected to the first fluid control means 30, receives the first fluid level signal and responsively conditions the first fluid control means 30 to deliver fluid flow from the second reservoir 16 to the intake oiling system 24 and from the first reservoir 16 to the engine bearing lubricating system 26 in response to receiving the first fluid level signal. Similarly, the control means 102 receives a second fluid level signal and responsively conditions the first fluid control means 30 to deliver fluid flow from the first reservoir 14 to the intake oiling system 24 and from the second reservoir 16 to the engine bearing lubricating system 26 in response to receiving the second fluid level signal. In the particular embodiment shown, the solenoids 42 of a first valve 36 of the first fluid control means 30 are connected to the control means 102 by first and second electrical conductors 104,106. The second electrical conductor 106 passes a valve control signal to the first valve 36 in response to the control means receiving the first fluid level signal and the first electrical conductor 104 passes a valve control signal to the first valve 36 in response to the control means 102 receiving said second fluid level signal. The first valve 36 moves to the second position 34 in response to receiving a valve control signal delivered by the second electrical conductor 106 and the first valve 36 moves to the first position 32 in response to receiving a valve control signal delivered by the first electrical conductor 104.

The control means 102 is also connected to the second fluid control means 50 and responsively conditions the second fluid control means 50 to deliver return fluid flow from the bearing lubricating system 26 to a selected one of the first and second reservoirs 14,16. In particular, the control means 102 conditions the second fluid control means 50 to deliver return lubricating fluid flow from the engine bearing lubricating system 26 to the first reservoir 14 in response to the control means 102 receiving the first fluid level signal. Alternatively, the control means 102 conditions the second fluid control means 50 to deliver return lubricating fluid flow from the engine bearing lubricating system 26 to the second reservoir 16 in response to the control means 102 receiving the second fluid level signal. In the particular embodiment shown, the solenoids 66 of the second valve 52 are connected to the control means 102 by way of first and second electrical conductors 108,110. The second electrical conductor 110 passes a valve control signal to the second valve 52 in response the control means 102 receiving the first fluid level signal and the first electrical conductor 108 passes a valve control signal to the second valve 50 in response to the control means 102 receiving the second fluid level signal. The second valve 52 moves to the first position 54 in response to receiving a valve control signal delivered by the first electrical conductor 108 and the second valve 52 moves to the second position 56 in response to receiving a valve control signal delivered by the second electrical conductor 110.

The control means 102 is also connected to the third fluid control means 70 and responsively conditions the third fluid control means 70 to deliver makeup fluid flow from the third reservoir 71 to a selected one of the first and second reservoirs 14,16. In particular, the control means 102 conditions the third fluid control means 70 to deliver makeup fluid flow from the third reservoir 71 to the first reservoir 14 in response to the control means 102 receiving the first fluid level signal and conditions the third fluid control means 70 to deliver makeup fluid flow to the second reservoir 16 in response to the control means 102 receiving the second fluid level signal. It is preferred that the control means 102 conditions the third fluid control means 70 to deliver makeup fluid flow to fill the emptied one of the first and second reservoirs 14,16 prior to the conditioning of the first and second fluid control means 30,50 and the swapping of the first and second reservoirs 14,16. In the particular embodiment shown, the solenoids 86 of the third valve 72 are connected to the control means 102 by way of first and second electrical conductors 112,114. The first electrical conductor 112 passes a valve control signal to the third valve 72 in response to the control means 102 receiving the first fluid level signal and the second electrical conductor 114 passes a valve control signal to the third valve 72 in response to the control means 102 receiving the second fluid level signal. The third valve 72 moves to the first position 74 in response to receiving the valve control signal delivered by the first electrical conductor 112 and the third valve 72 moves to the second position 76 in response to receiving a valve control signal delivered by the second electrical conductor 114. The third valve 72 is normally biased to the third position 78 in the absence of a valve control signal.

The control means 102 is connected to the first sensing means 90, such as the pair of switches thereof, by first and second conductors 116,118. The control means 102 is also connected to the second sensing means 96, such as a pair of switches thereof, by first and second conductors 120,122. The first and second conductors 116,118 respectively pass the first and third signals from the first sensing means 90 to the control means 102 and the first and second conductors 120,122 respectively pass the second and fourth signals from the second sensing means 96 to the control means 102.

The control means 102 preferably includes a controller 124 having an I/O interface 126, a processor 128, a memory 130, preprogrammed instructions stored in memory and a driver 132 all of conventional design. The first, second and third valves 36,52,72 are connected to the driver 132 by the first and second conductors 104,106,108,110,112,114. The processor 128 is connected to the driver 132 and commands the driver 132 to actuate the first, second and third valves 36,52,72 in accordance with the preprogrammed instructions. The I/O interface 136 is connected to the first and second electrical conductors 116,118,120,122 of the first and second sensing means 90,96 and receives the signals therefrom. The processor 128 executes the preprogrammed instructions and delivers the valve control signals in accordance with the first, second, third and fourth signals received from the first and second sensing means 90,96.

INDUSTRIAL APPLICABILITY

With reference to the drawings, and particular FIG. 2, the system 28 eliminates the need for lubrication changes and down time associated therewith and maintains a relatively clean lubricating fluid supply for the engine bearing lubrication system 26 by maintaining first and second separate lubricating reservoirs 14,16 for the engine bearing lubrication and intake oiling systems 26,24, by automatically swapping the reservoirs 14,16 when the lubricating fluid for the intake oiling system 24 is consumed (reaches a predetermined level) and by automatically refilling the emptied one of the reservoirs 14,16.

The system 28 responds to the lubricating fluid level in the first reservoir 14 being at the predetermined low level by delivering the first fluid level signal to the control means 102. The control means responds to this signal and conditions the first, second and third fluid control means 30,50,70. This conditioning causes a swapping of reservoirs 14,16 so that the direction of fluid flow in stead of being delivered from the first reservoir 14 to the intake oiling system 24 and from the second reservoir 16 to the engine bearing lubricating system 26 (as shown in FIG. 2) is delivered from the second reservoir 16 to the intake oiling system 24 and from the first reservoir 14 to the engine bearing lubricating system 26.

At the same time of conditioning of the first fluid control means 30, the second fluid control means 50 is conditioned to swap the direction of return lubricating fluid flow so that instead of being delivered from the engine bearing lubricating system 26 to the second reservoir 16 the return lubricating fluid flow is delivered from the engine bearing lubricating system 26 to the first reservoir 14.

The third fluid control means 70 is conditioned to deliver make up lubricating fluid flow from the third reservoir 71 to the now substantially emptied first reservoir 14 just prior to the swapping of the first and second reservoirs 14,16 so that an adequate supply of clean lubricating fluid is available for delivery to the engine bearing lubricating system 26. The above discussed conditioning is achieved by delivering valve control signals to the first, second and third fluid control means 30,50,70 to condition the valves 32,52,72 thereof to move to the appropriate one of the first and second positions 32,34,54,56,74,76 and thereby direct lubricating fluid flow in the proper direction.

Termination of filling of either of the first and second reservoirs 14,16 is achieved when the fluid level in the one of the first and second reservoirs 14,16 being filled reaches the full level and an appropriate one of the third and fourth signals is received by the control means 102. The control means 102 responds to this signal and conditions the third fluid flow control means 70 to stop delivery of makeup fluid flow from the third reservoir 71 to the reservoir 14,16 being filled. Fluid flow to the reservoir 14,16 is stopped when the third valve control signal is terminated and the third valve 72 is returned to the third position 78 under the influence of the centering springs 88.

The control means 102 reverses the above when the lubricating fluid delivered from the second reservoir 16 to the intake oiling system 24 is consumed in the combustion process and the lubricating fluid level in the second reservoir 16 reaches the predetermined low level. The control means 102 responds to receiving the second fluid level signal by conditioning the first, second and third fluid control systems 30,50,70 to reverse the direction of lubricating fluid flow and to automatically swap the first and second reservoirs 14,16 and make up the substantially emptied one of the reservoirs 14,16.

Other aspects, objects and advantages of the present invention may be obtained from a further reading of the specification, drawings, and appended claims.

I claim:

1. A system for automatically controlling the flow of lubricating fluid in an internal combustion engine having an intake oiling system and an engine bearing lubricating system; comprising:

a first reservoir and a second reservoir each having a lubricating fluid carried therein, said lubricating fluids being separate from one another;

a first fluid control means for passing fluid flow from said second reservoir to the engine bearing lubricating system and from the said first reservoir to the intake oiling system;

a first sensing means for sensing the lubricating fluid level in the first reservoir and delivering a first signal in response to said lubricating fluid being at a preselected low level;

a control means for receiving said first signal and responsively conditioning said first fluid control means to swap reservoirs and deliver fluid flow from said second reservoir to the intake oiling system and from the first reservoir to the engine bearing lubricating system.

2. A system, as set forth in claim 1, including:

a second fluid control means connected to said engine lubricating system and said first and second reservoirs for delivering return lubricating fluid flow from said engine bearing lubricating system to a selected one of the first and second reservoirs;

said control means being connected to said second fluid control means and conditioning said second fluid control means to swap reservoirs and deliver return lubricating fluid flow from said engine bearing lubricating system to the first reservoir in response to said control means receiving said first signal.

3. A system, as set forth in claim 2, including:

a second sensing means for sensing the fluid level in said second reservoir and delivering a second signal in response to said lubricating fluid in said second reservoir being at a preselected low level;

said control means being connected to said second sensing means and conditioning said first fluid control means to swap reservoirs and deliver fluid flow from said second reservoir to the engine bearing lubricating system and from the first reservoir to the intake oiling system in response to receiving said second signal.

4. A system, as set forth in claim 2, including:

a third reservoir having a makeup lubricating fluid carried therein;

a third fluid control means connected to said first, second and third reservoirs for selectively controlling the passing of makeup lubricating fluid from said third reservoir to said first and second reservoirs;

said control means being connected to said third fluid control means and conditioning said third fluid control means to deliver makeup lubricating fluid flow to a one of the first and second reservoirs in response to said lubricating fluid in said one of the first and second reservoirs being at said preselected low level.

5. A system, as set forth in claim 3, including:

a third reservoir having a makeup lubricating fluid carried therein;

a third fluid control means connected to said first, second and third reservoirs for selectively controlling the passing of makeup lubricating fluid to said first and second reservoirs;

said control means being connected to said third fluid control means and conditioning said third fluid control means to deliver makeup lubricating fluid flow to a one of the first and second reservoirs in response to said lubricating fluid in said one of the first and second reservoirs being at said preselected low level.

6. A system, as set forth in claim 5, wherein said first sensing means delivers a third signal in response to the lubricating fluid in an said first reservoirs being at a predetermined full level and said second sensing means delivers a fourth signal in response to the fluid level in the second reservoir being at a predetermined full level, said control means receiving said third and fourth signals and conditioning said third fluid control means to stop the delivery of makeup lubricating fluid to said one of the first and second reservoirs in response to said one of the first and second reservoirs being at said preselected full level.

7. A system for automatically controlling the flow of lubricating fluid in an internal combustion engine having an intake oiling system and an engine bearing lubricating system; comprising:

a first reservoir having a lubricating fluid therein;

a second reservoir having a lubricating fluid therein, said lubricating fluids in said first and second reservoirs being separate from one another;

a first sensor connected to the first reservoir and sensing a level of the lubricating fluid therein, said first sensor delivering a first fluid level signal in response to the lubricating fluid in the first reservoir being at a predetermined low level;

a second sensor connected to the second reservoir and sensing a level of the lubricating fluid therein, said second sensor delivering a second fluid level signal in response to the lubricating fluid in the second reservoir being at a predetermined low level;

a first valve having first and second fluid directing positions and being movable therebetween, said first valve being connected to the first and second reservoirs and the intake oiling and engine bearing lubricating systems, said first valve passing fluid flow from the second reservoir to the engine bearing lubricating system and from the first reservoir to the intake oiling system at the first position, and passing fluid flow from the second reservoir to the intake oiling system and from the first reservoir to the engine bearing lubricating system at the second position;

a second valve having first and second fluid directing positions and being movable therebetween, said second valve being connected to the engine lubricating system and the first and second reservoirs, said second valve passing fluid flow from the engine lubricating system to the first reservoir at the second position and from the engine lubricating system to the second reservoir at the first position;

a controller connected to the first and second sensors and being adapted to receive said first and second fluid level signals, said controller being connected to said first and second valves and delivering a valve control signal to said first and second valves in response to receiving one of said first and second fluid level signals, said first and second valves moving to said second position in response to said controller receiving said first fluid level signal and to said first position in response to said controller receiving said second fluid level signal.

8. A system, as set forth in claim 7, including:

a makeup reservoir containing a supply of lubricating fluid;

a third valve connected to said makeup, first and second reservoirs, said third valve having first and second fluid directing positions and being movable therebetween, said make up valve directing makeup fluid flow from said makeup reservoir to said first reservoir at the first position and directing fluid flow to said second reservoir at the second position;

said controller being connected to the third valve and delivering a valve control signal to the third valve in response to receiving said one of the first and second signals, said third valve moving to the first position in response to said controller receiving said first signal and to said second position in response to said controller receiving said second signal.

9. A system, as set forth in claim 8, wherein said third valve has a third position at which fluid flow from said makeup reservoir to either of said first and second reservoirs is blocked at said third valve.

10. A system, as set forth in claim 9, wherein said first sensor delivers a third fluid level signal in response to the lubricating fluid level in said first reservoir being at a predetermined full level and said second sensor delivers a forth fluid level signal in response to the lubricating fluid level in said second reservoir being at a predetermined full level, said controller receiving said third and forth signals and moving said third valve from one of the first and second positions to the third position in response to receiving an one of said third and forth signals.

11. A system, as set forth in claim 9, wherein said third valve is spring biased to the third position.

12. A system, as set forth in claim 7, including:

a first fluid pump connected in fluid communication between the first valve and the lubricating system; and a second fluid pump connected in fluid communication between the first valve and intake oiling system.

13. A system, as set forth in claim 7, wherein said first and second valves each having a detent and being maintained by said detent at said one of said first and second positions in the absence of receiving said valve control signal.

14. A system, as set forth in claim 8, wherein said first, second and third valves are solenoid operated valves and said valve control signals are electrical signals.

15. A system, as set forth in claim 8, wherein said controller includes a microprocessor.

16. A system, as set forth in claim 8, wherein said controller delivering a valve control signal to the third valve prior to delivering a valve control signal to said first and second valves.

* * * * *